United States Patent
Maruyama

(10) Patent No.: US 9,940,451 B2
(45) Date of Patent: Apr. 10, 2018

(54) RELAY APPARATUS, SYSTEM, RELAY METHOD, AND NON-TRANSITORY COMPUTER READABLE MEDIUM

(71) Applicant: FUJI XEROX CO., LTD., Minato-ku, Tokyo (JP)

(72) Inventor: Yasuhiro Maruyama, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 397 days.

(21) Appl. No.: 14/553,475

(22) Filed: Nov. 25, 2014

(65) Prior Publication Data
US 2015/0332041 A1 Nov. 19, 2015

(30) Foreign Application Priority Data
May 13, 2014 (JP) .................. 2014-099680

(51) Int. Cl.
G06F 21/45 (2013.01)
H04L 29/06 (2006.01)

(52) U.S. Cl.
CPC .............. G06F 21/45 (2013.01); H04L 67/42 (2013.01); H04L 63/083 (2013.01)

(58) Field of Classification Search
CPC ....................................................... G06F 21/45
USPC ............................................................ 726/27
See application file for complete search history.

(56) References Cited

U.S. PATENT DOCUMENTS

2005/0154574 A1* 7/2005 Takemura ........... H04L 12/2803
703/22
2012/0113471 A1 5/2012 Shimada et al.

FOREIGN PATENT DOCUMENTS

JP  2012-113701 A  6/2012
JP  2012-118971 A  6/2012

* cited by examiner

Primary Examiner — Jacob Lipman
(74) Attorney, Agent, or Firm — Sughrue Mion, PLLC

(57) ABSTRACT

A relay apparatus includes a memory that stores a user management table used to manage user information including state information indicating a state of a right of use of a service for every user; a receiving unit that receives a request to delete the right of use of the user from a client apparatus; a changing unit that changes a value of the state information about the user corresponding to the request in the state information to a value indicating deletion; a transmitting unit that transmits a response to the received request; and a process executing unit that executes a process for deleting data concerning the user the state information about whom has the value indicating the deletion from a storage area of the relay apparatus, in which the data is stored, and a storage area of another relay apparatus, in which the data is stored, at predetermined timing.

10 Claims, 6 Drawing Sheets

| USER ID | USER NAME | MAIL ADDRESS | PASSWORD | STATE INFORMATION | ORGANIZATION ID |
|---|---|---|---|---|---|
| 1 | John | John@··· | Oawfe | REGISTERED | 10 |
| 7 | Bob | Bob@··· | Lk;wte | NOT_REGISTERED | 11 |
| ⋮ | ⋮ | ⋮ | ⋮ | ⋮ | ⋮ |

| ORGANIZATION ID | ORGANIZATION NAME | STATE INFORMATION | ORGANIZATION TYPE |
|---|---|---|---|
| 10 | CompanyA | REGISTERED | MANAGED |
| 11 | Bob@··· | NOT_REGISTERED | PERSONAL |
| ⋮ | ⋮ | ⋮ | ⋮ |

| AREA TYPE | USER ID | PROCESSING INFORMATION |
|---|---|---|
| AREA A | 7 | USER PROFILE DELETION PROCESS |
| | 7 | AUTHENTICATION TOKEN DELETION PROCESS |
| | 7 | OTHER DATA DELETION PROCESS |
| | 21 | USER PROFILE DELETION PROCESS |
| | 88 | USER PROFILE DELETION PROCESS |
| AREA B | 7 | USER PROFILE DELETION PROCESS |
| | 7 | AUTHENTICATION TOKEN DELETION PROCESS |
| | 7 | OTHER DATA DELETION PROCESS |
| ⋮ | ⋮ | ⋮ |

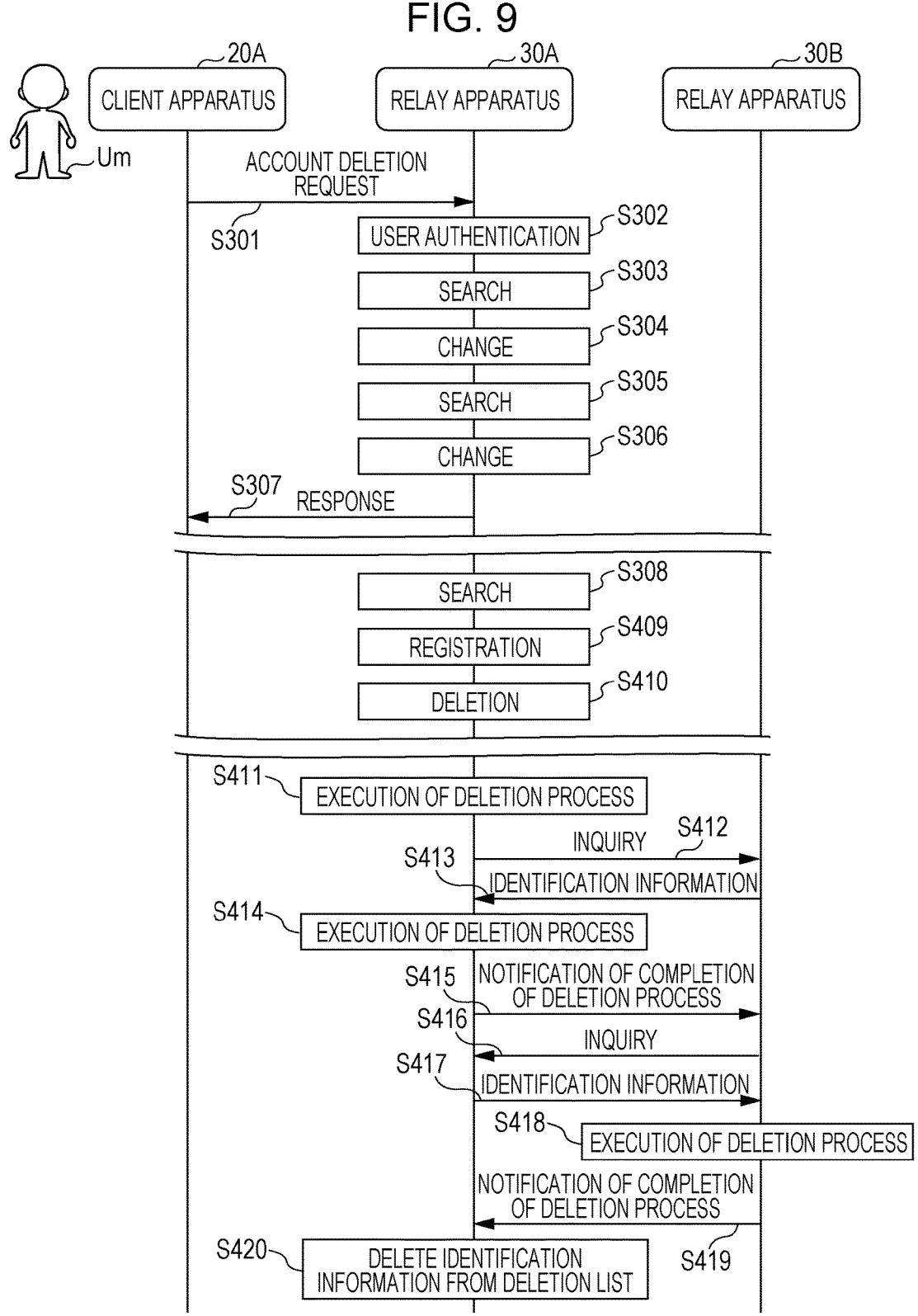

RELAY APPARATUS, SYSTEM, RELAY METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-099680 filed May 13, 2014.

BACKGROUND (i) Technical Field

The present invention relates to a relay apparatus, a system, a relay method, and a non-transitory computer readable medium.

(ii) Related Art

A technology to access a server apparatus via a relay apparatus in use of the server apparatus on a network is known.

SUMMARY

According to an aspect of the invention, there is provided a relay apparatus including a memory, a receiving unit, a changing unit, a transmitting unit, and a process executing unit. The memory stores a user management table used to manage user information including state information indicating a state of a right of use of a service for every user. The receiving unit receives a request to delete the right of use of the user from a client apparatus. Upon reception of the request, the changing unit changes a value of the state information about the user corresponding to the request, in the state information stored in the user management table, to a value indicating deletion. Upon change of the value of the state information, the transmitting unit transmits a response to the received request. The process executing unit executes a process for deleting data concerning the user the state information about whom has the value indicating the deletion from a storage area of the apparatus, in which the data is stored, and a storage area of another relay apparatus, in which the data is stored, at predetermined timing.

BRIEF DESCRIPTION OF THE DRAWINGS

Exemplary embodiments of the present invention will be described in detail based on the following figures, wherein:

FIG. 5 illustrates an example of a user management table;

FIG. 6 illustrates an example of an organization management table;

FIG. 7 illustrates an example of a deletion table;

FIG. 9 is a sequence diagram indicating an exemplary operation of the system according to the second exemplary embodiment.

DETAILED DESCRIPTION

1. First Exemplary Embodiment 1-1. Configuration

Figure 1:
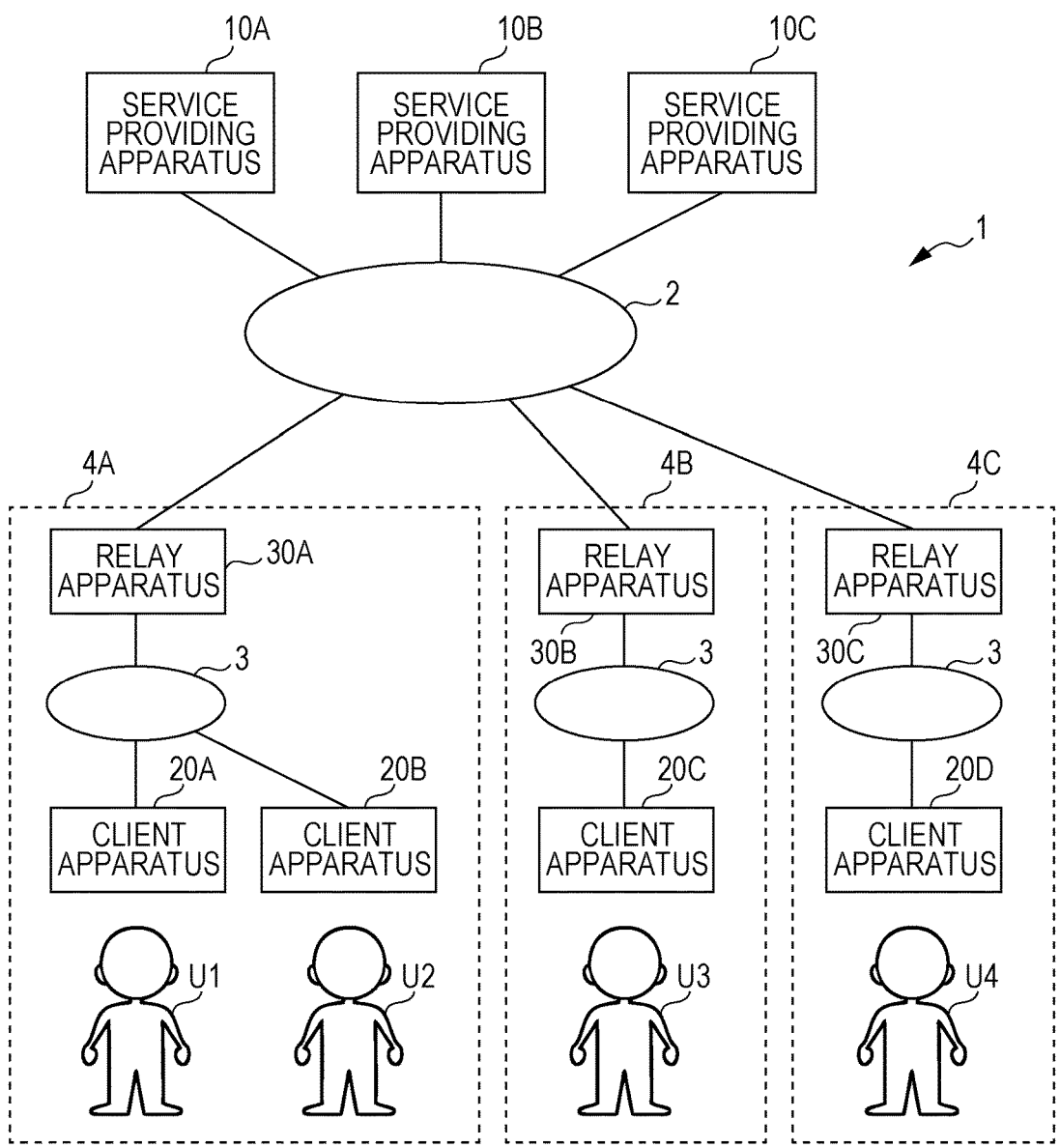
FIG. 1 illustrates an exemplary entire configuration of a system according to a first exemplary embodiment of the present invention.

FIG. 1 illustrates an exemplary entire configuration of a system 1 according to a first exemplary embodiment of the present invention. Referring to FIG. 1, the system 1 includes service providing apparatuses 10A, 10B, and 10C, client apparatuses 20A, 20B, 20C, and 20D, and relay apparatuses 30A, 30B, and 30C. In the following description, when it is not necessary to discriminate between the service providing apparatuses 10A, 10B, and 10C, the service providing apparatuses 10A, 10B, and 10C are collectively referred to as a "service providing apparatus 10." When it is not necessary to discriminate between the client apparatuses 20A, 20B, 20C, and 20D, the client apparatuses 20A, 20B, 20C, and 20D are collectively referred to as a "client apparatus 20." When it is not necessary to discriminate between the relay apparatuses 30A, 30B, and 30C, the relay apparatuses 30A, 30B, and 30C are collectively referred to as a "relay apparatus 30." The service providing apparatus 10 is connected to the relay apparatus 30 via a communication line 2, such as the Internet. The client apparatus 20 is connected to the relay apparatus 30 via a communication line 3, such as the Internet or a local area network (LAN). The client apparatus 20 may be connected to the communication line 2 not via the communication line 3 and the relay apparatus 30.

The service providing apparatus 10 provides various services, such as a service to store data. The service may a so-called cloud service. The client apparatus 20 is, for example, an image processing apparatus and is used by a user to access a service provided by the service providing apparatus 10. The client apparatus 20 may have multiple functions including a copy function, a print function, and a facsimile function, in addition to a scanner function. The relay apparatus 30 has a function to relay data exchange between the client apparatus 20 and the service providing apparatus 10.

In the example illustrated in FIG. 1, the client apparatus 20 is placed in any of multiple areas 4A, 4B, and 4C. The relay apparatus 30A relays the data exchange between the client apparatuses 20A and 20B placed in the area 4A and the service providing apparatus 10. The relay apparatus 30B relays the data exchange between the client apparatus 20C placed in the area 4B and the service providing apparatus 10. The relay apparatus 30C relays the data exchange between the client apparatus 20D placed in the area 4C and the service providing apparatus 10. In the following description, when it is not necessary to discriminate between the areas 4A, 4B, and 4C, the areas 4A, 4B, and 4C are collectively referred to as an "area 4."

The user of the system 1 belongs to any of the areas 4A, 4B, and 4C. In the following description, the area 4 to which a user belongs is called "home" for the user and areas to which the user does not belong are called "away" for convenience. In the example illustrated in FIG. 1, the home of a user U1 and a user U2 is the area 4A and the area 4B and the area 4C are the away for the user U1 and the user U2. The user normally uses the client apparatus 20 placed in the area 4 to which the user belongs to perform various operations. Information concerning each user (user information), such as account information about the user, is registered in the relay apparatus 30 in the area 4 to which the user belongs. The relay apparatus 30 performs processing, such as user authentication, on the basis of the user information registered in the own apparatus. In the following description, when it is not necessary to discriminate between the users U1, U2, U3, and U4, the users U1, U2, U3, and U4 are collectively referred to as a "user U."

Figure 2:
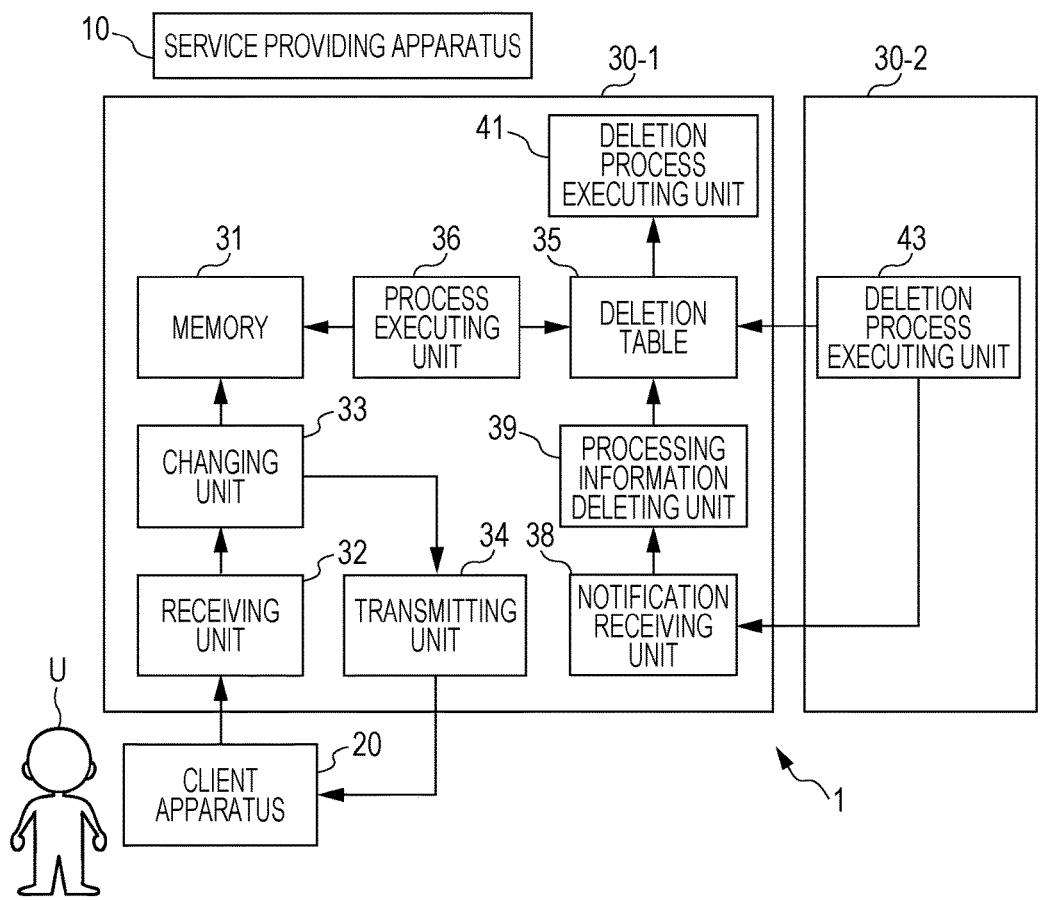
FIG. 2 is a block diagram illustrating an exemplary functional configuration of the system according to the first exemplary embodiment.

FIG. 2 is a block diagram illustrating an exemplary functional configuration of the system 1. Referring to FIG. 2, the system 1 includes the service providing apparatus 10, the client apparatus 20, a relay apparatus 30-1, and a relay apparatus 30-2. The relay apparatus 30-1 is an example of a first relay apparatus and the relay apparatus 30-2 is an example of a second relay apparatus. The relay apparatus 30-1 includes a memory 31, a receiving unit 32, a changing unit 33, a transmitting unit 34, a deletion table 35, a process executing unit 36, a notification receiving unit 38, a processing information deleting unit 39, and a deletion process executing unit 41.

The memory 31 stores a user management table used to manage user information including state information indicating the state of the right of use of each service for every user. The receiving unit 32 receives a request to delete the right of use of the user from the client apparatus 20. Upon reception of the request from the client apparatus 20, the changing unit 33 changes the value of the state information about the user corresponding to the request, among the pieces of state information stored in the user management table, to a value indicating deletion. Upon change of the value of the state information by the changing unit 33, the transmitting unit 34 transmits a response to the received request to the client apparatus 20.

The process executing unit 36 executes a process for deleting data concerning the user the state information about whom has the value indicating the deletion from a storage area of the own apparatus and a storage area of the other relay apparatus 30 at predetermined timing. In the example illustrated in FIG. 2, the process executing unit 36 registers one or multiple pieces of state information indicating the process to delete the data corresponding to the user the state information about whom has the value indicating the deletion in the deletion table 35. The process executing unit 36 deletes the user information corresponding to the processing information registered in the deletion table 35 from the user management table.

The notification receiving unit 38 receives a notification indicating that the execution of the deletion process indicated by the processing information registered in the deletion table 35 is completed from the other relay apparatus 30-2. The processing information deleting unit 39 deletes the processing information corresponding to the notification received by the notification receiving unit 38 from the deletion table 35.

The deletion process executing unit 41 executes a process to delete the data concerning the user the state information about whom has the value indicating the deletion in the user management table from the storage area of the own apparatus at predetermined timing. In addition, the deletion process executing unit 41 executes a process to delete the data concerning the user the state information about whom has the value indicating the deletion in the user management table from the storage area of the other relay apparatus 30-2 at predetermined timing. In the example illustrated in FIG. 2, the deletion process executing unit 41 executes the deletion process indicated by the processing information registered in the deletion table 35 stored in the own apparatus at the predetermined timing. In addition, the deletion process executing unit 41 executes the deletion process indicated by the processing information registered in the deletion table 35 stored in the other relay apparatus 30-2 at the predetermined timing.

The relay apparatus 30-2 includes a deletion process executing unit 43. The deletion process executing unit 43 executes a process to delete the data concerning the user the state information about whom has the value indicating the deletion in the user management table in the own apparatus from the storage area of the own apparatus and the storage area of the other relay apparatus at predetermined timing. In the example illustrated in FIG. 2, the deletion process executing unit 43 executes the deletion process indicated by the processing information registered in the deletion table 35 stored in the other relay apparatus 30-1 at the predetermined timing. The deletion process executing unit 43 transmits the notification indicating that the execution of the deletion process indicated by the processing information registered in the deletion table 35 is completed to the other relay apparatus 30-1.

Figure 3:
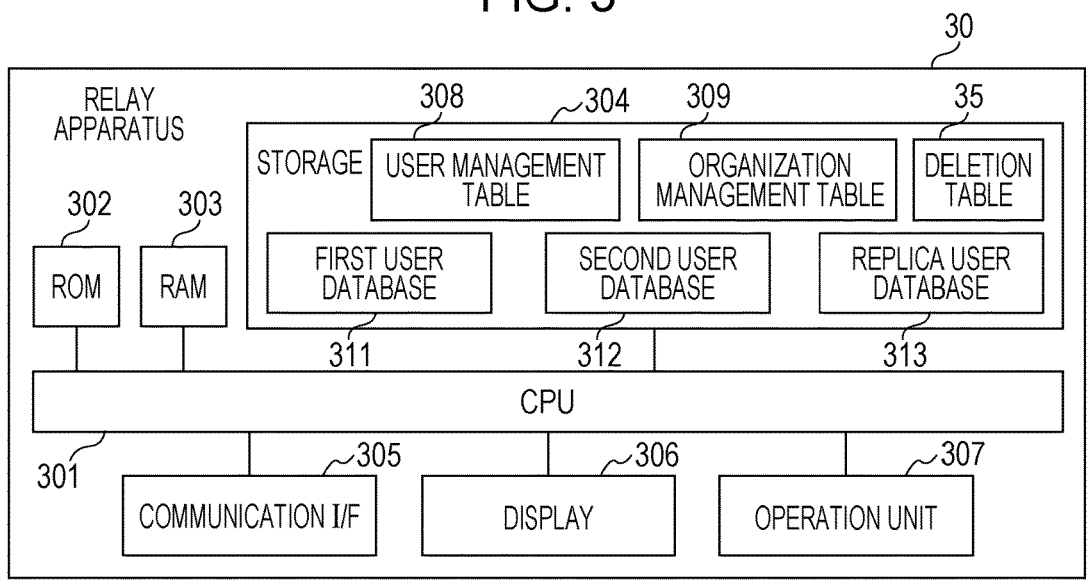
FIG. 3 is a block diagram illustrating an exemplary hardware configuration of a relay apparatus.

FIG. 3 is a block diagram illustrating an exemplary hardware configuration of the relay apparatus 30. Referring to FIG. 3, the relay apparatus 30 is a computer apparatus including a central processing unit (CPU) 301, a read only memory (ROM) 302, a random access memory (RAM) 303, a storage 304, a communication interface (I/F) 305, a display 306, and an operation unit 307. The CPU 301 is a controller (processor) that controls each component in the relay apparatus 30. The ROM 302 is a non-volatile memory that stores programs and data. The RAM 303 is a volatile main memory functioning as a working area in the execution of the programs by the CPU 301. The storage 304 is a non-volatile auxiliary memory that stores programs and data. The communication I/F 305 is an interface for communication via the communication line 2. In the example illustrated in FIG. 2, the communication I/F 305 is particularly an interface to communicate with the service providing apparatus 10, the client apparatus 20, and the other relay apparatus 30.

In the example illustrated in FIG. 2, a relay program stored in the storage 304 (or the ROM 302) is executed by the CPU 301 to implement the functions illustrated in FIG. 2. The storage 304 is an example of the memory 31 and the deletion table 35. The CPU 301 that is executing the relay program or the CPU 301 and the communication I/F 305 are an example of the receiving unit 32, the transmitting unit 34, the notification receiving unit 38, the deletion process executing unit 41, and the deletion process executing unit 43. The CPU 301 is an example of the changing unit 33, the process executing unit 36, and the processing information deleting unit 39.

The storage 304 stores a user management table 308, an organization management table 309, the deletion table 35, a first user database 311, a second user database 312, and a replica user database 313. The user management table 308, the organization management table 309, the deletion table 35, the first user database 311, and the second user database 312 are referred to when the own apparatus operates as the relay apparatus in the home. In contrast, the replica user database 313 is referred to when the own apparatus operates as the relay apparatus in the away. The user management table 308 and the organization management table 309 are examples of the user management table.

A detailed description of the hardware configurations of the service providing apparatus 10 and the client apparatus 20 is omitted herein. The service providing apparatus 10 is a computer apparatus including a CPU, a ROM, a RAM, a storage, and a communication interface. The client apparatus 20 is an image forming apparatus including a CPU, a ROM, a RAM, a storage, an operation unit, a display, an image reading unit, and an image forming unit.

1-2. Operation

An exemplary operation of the system 1 will now be described. The user normally uses the client apparatus 20 placed in the home. First, the user registers the account in the relay apparatus 30 in the home using the client apparatus 20 placed in the home. Then, when a service provided by the service providing apparatus 10 is used, the user accesses the service providing apparatus 10 using the client apparatus 20 placed in the home. The user may temporarily move to the away, for example, because of a business trip. In this case, the user uses the service using the client apparatus 20 placed in the away. The account information concerning the user, in the information in the user management table managed by the relay apparatus 30 in the home, is temporarily copied to the replica user database in the relay apparatus 30 in the away. The user is capable of using the service from the client apparatus 20 set in the away using the account information that is temporarily copied. When the account registered in the relay apparatus 30 is made unnecessary or when the account is required to be deleted, the account is deleted by the user or a manager of the system. An operation by the manager of the system to delete the account of the user registered in the relay apparatus 30 will be described below.

Figure 4:
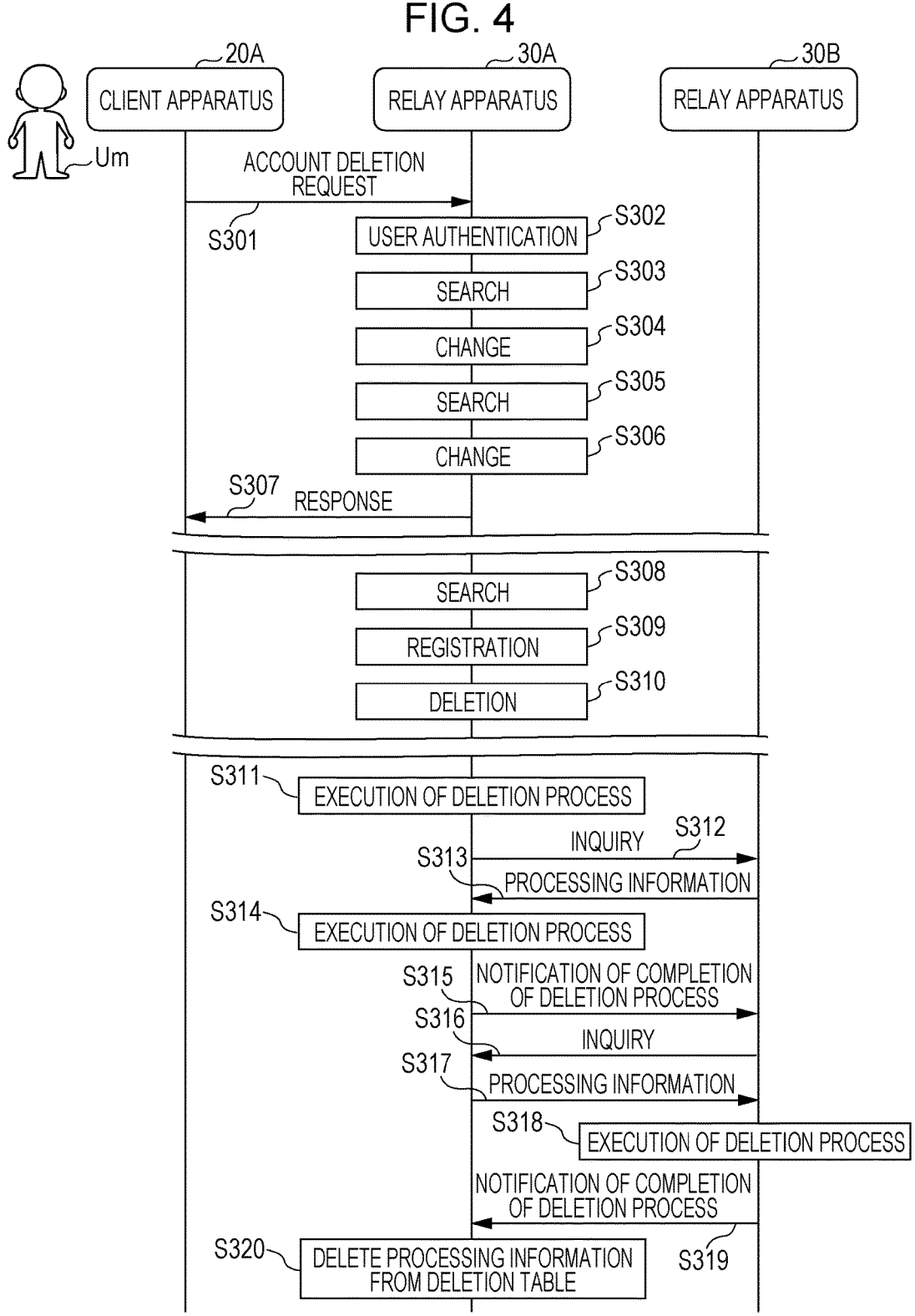
FIG. 4 is a sequence diagram indicating an exemplary operation of the system according to the first exemplary embodiment.

FIG. 4 is a sequence diagram indicating an exemplary operation to delete the account of a user. An operation by a manager Um of the relay apparatus 30A to delete the account of the user U1 using the client apparatus 20A is indicated in the example illustrated in FIG. 4. First, the manager Um submits an account deletion request to the relay apparatus 30A using the client apparatus 20A. Specifically, the manager Um inputs a user ID of the user the account of whom is to be deleted and the account information about the manager Um (for example, a user ID and a password) through an operation with the operation unit in the client apparatus 20A. For example, the manager Um inputs "user01" as the user ID of the user the account of whom is to be deleted, inputs "user99" as the user ID of the manager Um, and inputs "password99" as the password of the manager Um.

Referring to FIG. 4, in Step S301, the client apparatus 20A transmits the account deletion request (hereinafter simply referred to as a "request") including the account information, input with the operation by the manager Um, to the relay apparatus 30A.

In Step S302, the CPU 301 in the relay apparatus 30A performs the user authentication using the user management table 308 with the account information included in the received request. The user management table 308 is a table to manage the user information including the state information indicating the state of the right of use of the user. The user information about the user belonging to the area 4 corresponding to the own apparatus is registered in the user management table 308. In other words, the user information registered in the user management table 308 is varied depending on the relay apparatus 30. For example, in the example illustrated in FIG. 1, the user information about the user U1 and the user information about the user U2 are stored in the user management table 308 in the relay apparatus 30A and are not stored in the user management table 308 in the relay apparatus 30B and the user management table 308 in the relay apparatus 30C. The user information about the user U3 is stored in the user management table 308 in the relay apparatus 30B and is not stored in the user management table 308 in the relay apparatus 30A and the user management table 308 in the relay apparatus 30C. The user information about the user U4 is stored in the user management table 308 in the relay apparatus 30C and is not stored in the user management table 308 in the relay apparatus 30A and the user management table 308 in the relay apparatus 30B.

FIG. 5 illustrates an example of the user management table 308. A user name, a mail address, a password, the state information, and an organization ID corresponding to each user ID are stored in the user management table 308 in association with each other. The user ID is identification information for identifying each user. The user name is a character string indicating the name of the user. The mail address is a mail address allocated to the user. The password is information necessary to log on the relay apparatus 30. The state information is information indicating the state of the right of use of the service. "REGISTERED" or "NOT_REGISTERED" is set as the value of the state information. The value "REGISTERED" is set for the state information about the user having the right of use of the service provided by the relay apparatus 30. In contrast, the value "NOT_REGISTERED" is set for the state information about the user who does not have the right of use of the service provided by the relay apparatus 30. The organization ID is identification information for identifying the organization (for example, department) to which the user belongs.

Referring back to FIG. 4, in Step S302, if the account information included in the request received in Step S301 is registered in the user management table 308 and the state information corresponding to the account information has the value "REGISTERED", the user authentication succeeds. In contrast, if the account information included in the received request is not registered in the user management table 308 or if the state information corresponding to the account information has the value "NOT_REGISTERED", the user authentication fails.

If the user authentication succeeds in Step S302, in Step S303, the CPU 301 searches the user management table 308 in the storage 304 for the user ID included in the received request. In Step S304, the CPU 301 changes the value of the state information corresponding to the user ID searched for in the user management table 308 from "REGISTERED" to "NOT_REGISTERED." The value of the state information, which is set to "NOT_REGISTERED", invalidates the right of the user to disable the user from logging on the relay apparatus 30A.

In Step S305, the CPU 301 searches the organization management table 309 for the user ID included in the received request or the mail address registered in the user management table 308 in association with the user ID.

FIG. 6 illustrates an example the content of the organization management table 309. An organization name, the state information, and an organization type corresponding to each organization ID are stored in the organization management table 309 in association with each other. The organization ID is identification information for identifying each organization. The organization name is a character string indicating the name of the organization. The state information is information indicating the state of the right of use of the service. "REGISTERED" or "NOT_REGISTERED" is set as the value of the state information. The value "REGISTERED" is set for the state information about the organization having the right of use of the service provided by the relay apparatus 30. In contrast, the value "NOT_REGISTERED" is set for the state information about the organization which does not have the right of use of the service provided by the relay apparatus 30. The organization type is information indicating the type of the organization. "MANAGED" or "PERSONAL" is set as the value of the organization type. In the example illustrated in FIG. 6, when multiple users belong to the organization, the value "MANAGED" is set as the value of the organization type. In contrast, when one user belongs to the organization, the value "PERSONAL" is set as the value of the organization type. In the example illustrated in FIG. 6, the mail address of the user belonging to the organization is registered in the organization name of the organization the organization type of which is "PERSONAL."

If the mail address of the user the account of whom is to be deleted is searched for from the organization management table 309 in Step S305, in Step S306, the CPU 301 changes the value of the state information corresponding to the mail address that is searched for from "REGISTERED" to "NOT_REGISTERED." Upon completion of Step S306, in Step S307, the CPU 301 transmits a response indicating that the deletion process is accepted to the client apparatus 20A as the response to the request received in Step S301.

Then, the CPU 301 performs the registration in the deletion table 35 in Step S308 to Step S309 at predetermined timing. The predetermined timing is periodic timing, for example, a time when a predetermined time (one hour, one day, etc.) elapsed since the previous registration has been performed. The predetermined timing is not limited to the periodic timing. For example, the predetermined timing may be a time when the number of users the value of the state information about whom is "NOT_REGISTERED" is made greater than or equal to a predetermined threshold value. At the predetermined timing, in Step S308, the CPU 301 searches the user management table 308 and the organization management table 309 for the user the value of the state information about whom is "NOT_REGISTERED." In Step S309, the CPU 301 registers the processing information indicating the deletion process of the data concerning the user in the deletion table 35. In the example illustrated in FIG. 4, the processing information is information indicating which user data is to be deleted, such as a "user profile deletion process" or an "authentication token deletion process." The "user profile deletion process" indicates a process to delete a user profile. The user profile includes, for example, setting information about each user. The "authentication token deletion process" indicates a process to delete an authentication token. The authentication token is a token indicating the right to access the service providing apparatus 10. In the example illustrated in FIG. 4, the token is a data structure in which the identification information about the account and the right of the account are described.

FIG. 7 illustrates an example of the content of the deletion table 35. User IDs and the processing information for each area type are stored in the deletion table 35 in association with each other. The area type is information for identifying each area, that is, information for identifying the relay apparatus 30. The user ID is identification information for identifying each user. The processing information is information indicating a process to delete user data concerning the user the account of whom is to be deleted. In the example illustrated in FIG. 7, the user profile, the authentication token, and other data generated in processing of the service used by each user are used as the user data concerning the user. The user data is stored in the first user database 311 or the second user database 312 in the relay apparatus 30 in the home of the user. Copies of part or all of the user data stored in the first user database 311 or the second user database 312 in the relay apparatus 30 in the home are stored in the replica user database 313 in the relay apparatus 30 in the away of the user.

The example illustrated in FIG. 7 indicates that the deletion process of the data concerning three users: a user having a user ID "7", a user having a user ID "21", and a user having a user ID "88" remains. More specifically, the database of the relay apparatus 30 corresponding to the area type "area A" indicates that the deletion processes of three kinds are not performed for the user having the user ID "7" and that the deletion process of one kind is not performed for the user having the user ID "21" and the user having the user ID "88." In contrast, the database of the relay apparatus 30 corresponding to the area type "area B" indicates that the deletion processes of three kinds are not performed for the user having the user ID "7" and that the deletion process is completed for the user having the user ID "21" and the user having the user ID "88."

In the deletion of the account of the user, it is necessary to delete the user data stored in the first user database 311, the second user database 312, and the replica user database 313, in addition to the deletion of the account information about the user from the user management table 308 and the organization management table 309. In the first exemplary embodiment, the processing information indicating the process for deleting the user data stored in the first user database 311, the second user database 312, and the replica user database 313 is registered in the deletion table 35 in Step S309.

Upon completion of the registration of the processing information in the deletion table 35, in Step S310, the CPU 301 deletes a record including the user ID or the mail address corresponding to the processing information registered in the deletion table 35, that is, a record the value of the state information about which is "NOT_REGISTERED" from the user management table 308 and the organization management table 309.

Then, the CPU 301 executes a process to delete the user data in Step S311 to Step S314 at predetermined timing. The predetermined timing is periodic timing, for example, a time when a predetermined time (one hour, one day, etc.) elapsed since the previous registration has been performed. The predetermined timing is not limited to the periodic timing. For example, the predetermined timing may be a time when the processing information registered in the deletion table 35 meets a predetermined condition, for example, a time when the number of the pieces of processing information registered in the deletion table 35 is greater than or equal to a predetermined threshold value. The timing when the process to delete the user data is executed may be different from a time when the registration in the deletion table 35 is performed, may be the same time as the time when the registration in the deletion table 35 is performed, or may be continuous to the time when the registration in the deletion table 35 is performed. In Step S311, the CPU 301 executes the deletion process indicated by the processing information registered in the deletion table 35 of the own apparatus at the predetermined timing. More specifically, the CPU 301 executes the process to delete the user data stored in the first user database 311 and the second user database 312 on the basis of the processing information registered in the deletion table 35.

In Step S312, the CPU 301 inquires about the processing information registered in the deletion table 35 in the other relay apparatus 30 (the relay apparatus 30B in the example illustrated in FIG. 4). Although the relay apparatus 30B is exemplified as the other relay apparatus 30 in the example illustrated in FIG. 4, the number of the other relay apparatuses 30 is not limited to one and multiple other relay apparatuses 30 may be provided. When multiple other relay apparatuses 30 are provided, the CPU 301 may inquire of all the other relay apparatuses 30 about the processing information. In Step S313, the CPU 301 in the relay apparatus 30B transmits the processing information that is registered in the deletion table 35 of the own apparatus and that corresponds to the relay apparatus 30A from which the inquiry is transmitted to the relay apparatus 30A. In Step S314, the CPU 301 in the relay apparatus 30A executes the deletion process indicated by the processing information received from the relay apparatus 30B. More specifically, the CPU 301 executes the process to delete the user data stored in the replica user database 313 on the basis of the processing information received from the relay apparatus 30B. Upon completion of the deletion process in Step S314, in Step S315, the CPU 301 transmits a completion notification indicating that the deletion process is completed to the relay apparatus 30B from which the processing information is transmitted.

In Step S316, the CPU 301 in the relay apparatus 30A receives the inquiry about the processing information from the other relay apparatus 30 (the relay apparatus 30B) at predetermined timing. Upon reception of the inquiry, in Step S317, the CPU 301 in the relay apparatus 30A transmits the processing information that is registered in the deletion table 35 of the own apparatus and that corresponds to the relay apparatus 30 from which the inquiry is transmitted to the other relay apparatus 30. In Step S318, the relay apparatus 30B executes the deletion process indicated by the processing information received from the relay apparatus 30A. Specifically, the CPU 301 in the relay apparatus 30B executes the process to delete the user data stored in the replica user database 313 of the own apparatus on the basis of the processing information received from the relay apparatus 30A. In Step S319, the CPU 301 in the relay apparatus 30B transmits a completion notification indicating that the deletion process is completed to the relay apparatus 30A from which the processing information is transmitted. In Step S320, the CPU 301 in the relay apparatus 30A deletes the processing information corresponding to the received completion notification from the deletion table 35 of the own apparatus. Upon reception of the completion notification indicating that the deletion process is completed from the relay apparatus 30A, the CPU 301 in the relay apparatus 30B also deletes the processing information corresponding to the received completion notification from the deletion table 35 of the own apparatus.

In the first exemplary embodiment, when the request to delete the account of the user is received, the state information in the user management table 308 and the organization management table 309 is changed to the value indicating the deletion (NOT_REGISTERED) and the response is transmitted.

2. Second Exemplary Embodiment

Figure 8:
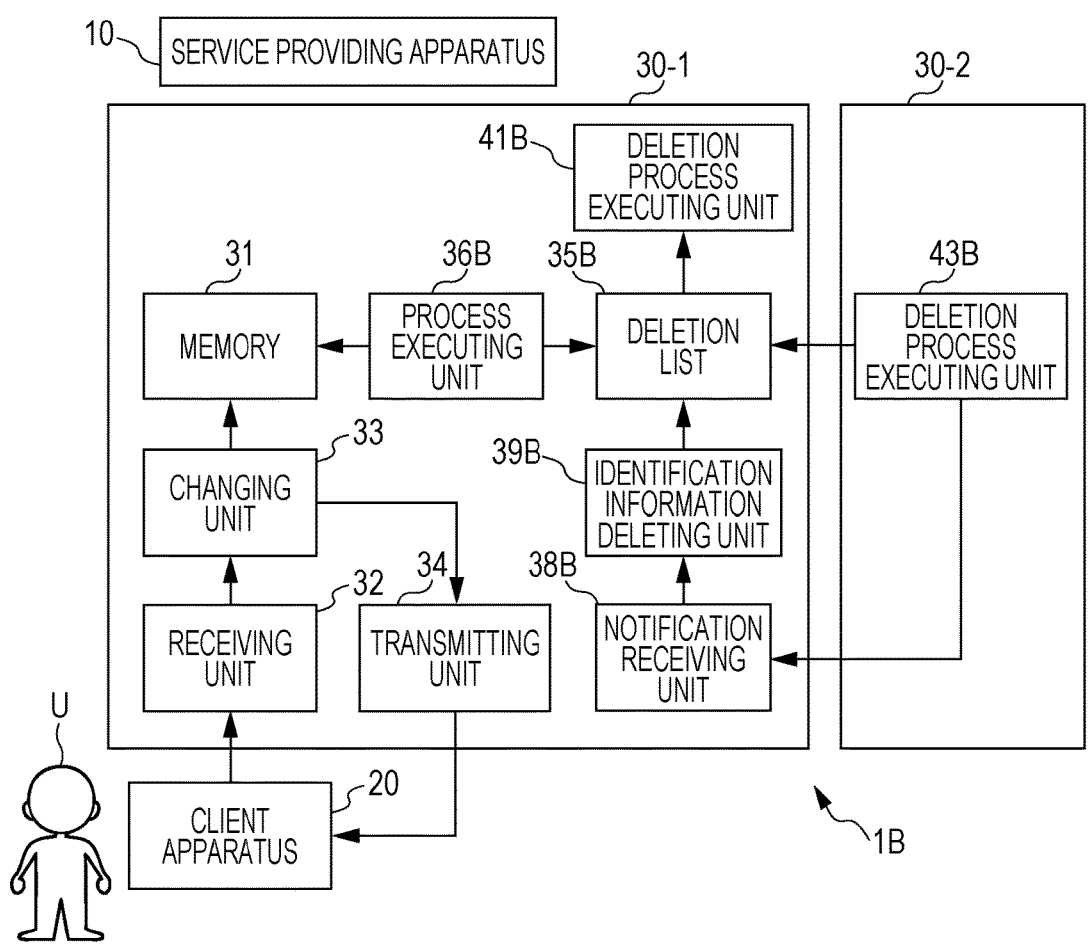
FIG. 8 is a block diagram illustrating an exemplary functional configuration of a system according to a second exemplary embodiment of the present invention.

FIG. 8 is a block diagram illustrating an exemplary functional configuration of a system 1B according to a second exemplary embodiment of the present invention. The entire configuration of the system 1B is the same as that of the system 1 of the first exemplary embodiment illustrated in FIG. 1. A description of the entire configuration of the system 1B is omitted herein. The system 1B according to the second exemplary embodiment differs from the system 1 according to the first exemplary embodiment in that the user ID of the user the account of whom is to be deleted is registered in a deletion list 35B, instead of the registration of the processing information indicating the process to delete the user data concerning the user the account of whom is to be deleted in the deletion table 35. The configuration of the system 1B illustrated in FIG. 8 differs from the configuration of the system 1 of the first exemplary embodiment illustrated in FIG. 2 in that the system 1B includes the deletion list 35B, a process executing unit 36B, a notification receiving unit 38B, an identification information deleting unit 39B, a deletion process executing unit 41B, and a deletion process executing unit 43B, instead of the deletion table 35, the process executing unit 36, the notification receiving unit 38, the processing information deleting unit 39, the deletion process executing unit 41, and the deletion process executing unit 43, respectively.

The process executing unit 36B adds the identification information (the user ID) for identifying the user the value of the state information about whom is the value indicating the deletion in the user management table 308 to the deletion list 35B at predetermined timing.

The notification receiving unit 38B receives a notification indicating that the deletion of the data concerning the user having the identification information registered in the deletion list 35B is completed from the other relay apparatus 30-2. The identification information deleting unit 39B deletes the identification information corresponding to the received notification from the deletion list 35B.

The deletion process executing unit 41B and the deletion process executing unit 43B each execute a process to delete the data corresponding to the user having the identification information registered in the deletion list 35B stored in the own apparatus at predetermined timing and each execute a process to delete the data corresponding to the user having the identification information registered in the deletion list 35B stored in the other relay apparatus at predetermined timing.

FIG. 9 is a sequence diagram indicating an exemplary operation to delete the account of a user in the second exemplary embodiment. The operation illustrated in FIG. 9 differs from the operation of the first exemplary embodiment illustrated in FIG. 4 in that Step S409 to Step S420 are executed, instead of Step S309 to S320 in FIG. 4. The same step numbers are used in FIG. 9 to identify the same steps illustrated in FIG. 4. A description of such steps is omitted herein.

Referring to FIG. 9, upon completion of Step S308, in Step S409, the CPU 301 in the relay apparatus 30A registers the user ID or the mail address of the user searched for in Step S308 in the deletion list 35B. In the example illustrated in FIG. 9, a queue is used as the deletion list 35B. In Step S410, the CPU 301 deletes a record including the user ID or the mail address registered in the queue, that is, a record the value of the state information about which is "NOT_REGISTERED" from the user management table 308 and the organization management table 309.

Then, the CPU 301 executes a process to delete the user data in Step S411 to Step S414 at predetermined timing. In Step S411, the CPU 301 executes the process to delete the user data corresponding to the identification information (the user ID or the mail address) registered in the deletion list 35B stored in the own apparatus at the predetermined timing. In the example illustrated in FIG. 9, the CPU 301 searches the first user database 311 and the second user database 312 for the user data corresponding to the identification information registered in the deletion list 35B to execute the process to delete the user data that is searched for.

In Step S412, the CPU 301 inquires about the identification information registered in the deletion list 35B in the other relay apparatus 30 (the relay apparatus 30B in the example illustrated in FIG. 9). Although the relay apparatus 30B is exemplified as the other relay apparatus 30 in the example illustrated in FIG. 9, the number of the other relay apparatuses 30 is not limited to one and multiple other relay apparatuses 30 may be provided. When multiple other relay apparatuses 30 are provided, the CPU 301 may inquire of all the other relay apparatuses 30 about the identification information. In Step S413, the CPU 301 in the relay apparatus 30B transmits the identification information registered in the deletion list 35B of the own apparatus to the relay apparatus 30A. In Step S414, the CPU 301 in the relay apparatus 30A executes the process to delete the user data corresponding to the identification information received from the relay apparatus 30B. In the example illustrated in FIG. 9, the CPU 301 searches the replica user database 313 for the user data corresponding to the identification information received from the relay apparatus 30B to execute the process to delete the user data that is searched for. In Step S415, the CPU 301 transmits a completion notification indicating that the deletion process is completed to the relay apparatus 30B from which the identification information is transmitted.

In Step S416, the CPU 301 in the relay apparatus 30A receives the inquiry about the identification information from the other relay apparatus 30 (the relay apparatus 30B) at predetermined timing. In Step S417, the CPU 301 in the relay apparatus 30A transmits the identification information registered in the deletion list 35B of the own apparatus to the relay apparatus 30B. In Step S418, the relay apparatus 30B executes the process to delete the user data corresponding to the identification information received from the relay apparatus 30A. Specifically, the CPU 301 in the relay apparatus 30B searches the replica user database 313 for the user data corresponding to the identification information received from the relay apparatus 30A to execute the process to delete the user data that is searched for. In Step S419, the CPU 301 in the relay apparatus 30B transmits a completion notification indicating that the deletion process is completed to the relay apparatus 30A from which the identification information is transmitted. In Step S420, the CPU 301 in the relay apparatus 30A deletes the identification information corresponding to the received completion notification from the deletion list 35B of the own apparatus. Upon reception of the completion notification indicating that the deletion process is completed from the relay apparatus 30A, the CPU 301 in the relay apparatus 30B also deletes the identification information corresponding to the received completion notification from the deletion list 35B of the own apparatus.

3. Modifications

The exemplary embodiments described above are only examples. The exemplary embodiments may be modified in the following manner. A combination of the modifications described below may be adopted.

3-1. First Modification

The CPU 301 registers the processing information in the deletion table 35 in Step S309 and deletes the record the value of the state information about which is "NOT_REGISTERED" from the user management table 308 in Step S310 in the first exemplary embodiment. The order of the steps is not limited to the above one. For example, the CPU 301 may perform Step S309 and Step S310 in parallel.

Instead of the execution of Step S310 after Step 309, the CPU 301 may perform the following processing. In this example, the CPU 301 registers the processing information in the deletion table 35 in Step S309 and changes the value of the state information corresponding to the user the processing information about whom is registered in the deletion table 35 from "NOT_REGISTERED" to "DELETING." Then, at predetermined timing, the CPU 301 searches the user management table 308 for the user the value of the state information about whom is "DELETING" and determines whether the processing information about the user that is searched for remains in the deletion table 35. If no processing information about the user remains in the deletion table 35, the CPU 301 deletes the record corresponding to the user from the user management table 308. If the processing information about the user remains in the deletion table 35, the CPU 301 does not perform the deletion of the record.

3-2. Second Modification

Although the processing information is managed with one deletion table 35 in the first exemplary embodiment described above, the processing information is not limitedly managed in the above manner. For example, the processing information may be managed with multiple deletion tables provided for the respective areas.

Although the user ID and the processing information are registered in the deletion table 35 in association with each other in the first exemplary embodiment described above, the information registered in the deletion table 35 is not limited to the above one. For example, only the user ID may be registered in the deletion table. In this case, in the process to delete the user data, the CPU 301 searches the database for the user data corresponding to the user ID registered in the deletion table to execute the process to delete the user data that is searched for. The copies of part or all of the user data stored in the first user database 311 or the second user database 312 in the relay apparatus 30 in the home are stored in the replica user database 313 in the above exemplary embodiments. In addition to the above copies, copies of part or all of the data stored in the user management table 308 and the organization management table 309 may be stored in the replica user database 313.

3-3. Third Modification

The system 1 according to the first exemplary embodiment includes the service providing apparatuses 10A, 10B, and 10C, the client apparatuses 20A, 20B, 20C, and 20D, and the relay apparatuses 30A, 30B, and 30C. The number of the service providing apparatuses 10, the number of the client apparatuses 20, and the number of the relay apparatuses 30 are not limited to the ones illustrated in the system 1.

3-4. Fourth Modification

The programs executed by the CPU 301 in the relay apparatus 30 may be downloaded via a communication line, such as the Internet, in the above exemplary embodiments. Alternatively, the programs may be provided in a state in which the programs are recorded on a computer-readable recording medium, such as a magnetic recording medium (a magnetic tape, a magnetic disk, etc.), an optical recording medium (an optical disc, etc.), a magneto-optical disk, or a semiconductor memory.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A relay apparatus comprising:
a memory that stores a user management table used to manage user information including state information indicating a state of a right of use of a service for a plurality of users in a storage area;
a receiving unit that receives a request to delete the right of use of a user of the plurality of users from a client apparatus;
a changing unit that, upon reception of the request, changes a value of the state information about the user corresponding to the request, in the state information stored in the user management table, to a value indicating deletion;
a transmitting unit that, upon change of the value of the state information, transmits a response to the received request; and
a process executing unit that executes a process for deleting data for the user for which the value of the state information has been changed from the storage area of the relay apparatus, in which the data is stored, and a storage area of a different relay apparatus, in which the data is stored, at a predetermined time after a prior process for deleting data has been executed, at a periodic timing, or at a time when a number of users about whom the value of the state information is changed is equal to or greater than a predetermined threshold value.

2. The relay apparatus according to claim 1,
wherein the process executing unit registers at least one piece of processing information indicating the process to delete the data corresponding to the user the state information about whom has the value indicating the deletion in a deletion table, the relay apparatus further comprising:
a notification receiving unit that receives a notification indicating that the execution of the deletion process indicated by the processing information registered in the deletion table is completed from the different relay apparatus; and
a processing information deleting unit that deletes the processing information corresponding to the received notification from the deletion table.

3. The relay apparatus according to claim 2,
wherein the process executing unit deletes the user information corresponding to the processing information registered in the deletion table from the user management table.

4. The relay apparatus according to claim 2, further comprising:
a deletion process executing unit that executes the deletion process indicated by the processing information registered in the deletion table stored in the relay apparatus at predetermined timing and executes the deletion process indicated by the processing information registered in the deletion table stored in a different relay apparatus at predetermined timing.

5. The relay apparatus according to claim 1,
wherein the process executing unit adds identification information for identifying the user the state information about whom has the value indicating the deletion to a deletion list, the relay apparatus further comprising:
a notification receiving unit that receives a notification indicating that the deletion of data concerning the user having the identification information registered in the deletion list is completed from the different relay apparatus; and
an identification information deleting unit that deletes the identification information corresponding to the received notification from the deletion list.

6. The relay apparatus according to claim 5, further comprising:
a deletion process executing unit that executes the process to delete the data corresponding to the user having the identification information registered in the deletion list stored in the relay apparatus at predetermined timing and executes the process to delete the data corresponding to the user having the identification information registered in the deletion list stored in a different relay apparatus at predetermined timing.

7. A system comprising:
a first relay apparatus; and
a second relay apparatus,
wherein the first relay apparatus includes
a memory that stores a user management table used to manage user information including state information indicating a state of a right of use of a service for a plurality of users in a storage area;
a receiving unit that receives a request to delete the right of use of a user of the plurality of users from a client apparatus;
a changing unit that, upon reception of the request, changes a value of the state information about the user corresponding to the request, in the state information stored in the user management table, to a value indicating deletion;
a transmitting unit that, upon change of the value of the state information, transmits a response to the received request; and
a process executing unit that executes a process for deleting data for the user for which the value of the state information has been changed from the storage area of the first relay apparatus, in which the data is stored, and a storage area of the second relay apparatus, in which the data is stored, at predetermined timing, and
wherein the second relay apparatus includes
a deletion process executing unit that executes a process to delete data corresponding to the user for which the state information has been changed in the user management table in the first relay apparatus from a storage area of the second relay apparatus at a predetermined time after a prior process for deleting data has been executed, at a periodic timing, or at a time when a number of users about whom the value of the state information is changed is equal to or greater than a predetermined threshold value.

8. A non-transitory computer readable medium storing a program causing a computer to execute a process, the computer including a memory that stores a user management table used to manage user information including state information indicating a state of a right of use of a service for a plurality of users, the process comprising:

receiving a request to delete the right of use of a user of the plurality of users from a client apparatus;

changing, upon reception of the request, a value of the state information about the user corresponding to the request, in the state information stored in the user management table, to a value indicating deletion;

transmitting, upon change of the value of the state information, a response to the received request; and executing a process for deleting data for the user for which the value of the state information has been changed from a storage area of the computer, in which the data is stored, and a storage area of a different computer, in which the data is stored, at predetermined time after a prior process for deleting data has been executed, at a periodic timing, or at a time when a number of users about whom the value of the state information is changed is equal to or greater than a predetermined threshold value.

9. A relay method in a relay apparatus including a memory that stores a user management table used to manage user information including state information indicating a state of a right of use of a service for a plurality of users in a storage area, the method comprising:

receiving a request to delete the right of use of the user of the plurality of users from a client apparatus;

changing, upon reception of the request, a value of the state information about the user corresponding to the request, in the state information stored in a user management table, to a value indicating deletion;

transmitting, upon change of the value of the state information, a response to the received request; and executing a process for deleting data for the user for which the value of the state information has been changed from the storage area of the relay apparatus, in which the data is stored, and a storage area of a different relay apparatus, in which the data is stored, at predetermined time after a prior process for deleting data has been executed, at a periodic timing, or at a time when a number of users about whom the value of the state information is changed is equal to or greater than a predetermined threshold value.

10. The relay apparatus according to claim 1, wherein the storage area stores a replica user management table, and stores a deletion table that stores area information including areas that have the different relay apparatus and user identifiers identifying users, wherein the process for deleting data concerning the user comprises:

deleting data concerning the user in the relay apparatus, inquiring using a user identifier of the user in the deletion table of the different relay apparatus, receiving, from the different relay apparatus, processing information that corresponds to the relay apparatus, deleting data concerning the user from the replica user management table, notifying the different relay apparatus that the data concerning the user is deleted from the replica management table, deleting, after the notifying, the data in the storage area of the different relay apparatus.

* * * * *